(12) United States Patent
Shindo et al.

(10) Patent No.: US 7,740,546 B2
(45) Date of Patent: *Jun. 22, 2010

(54) GOLF BALL

(75) Inventors: Jun Shindo, Chichibu (JP); Takahiro Hayashi, Chichibu (JP)

(73) Assignee: Bridgestone Sports Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/481,997

(22) Filed: Jun. 10, 2009

(65) Prior Publication Data

US 2009/0247322 A1    Oct. 1, 2009

Related U.S. Application Data

(63) Continuation of application No. 11/878,943, filed on Jul. 27, 2007, now Pat. No. 7,566,280, which is a continuation-in-part of application No. 11/324,297, filed on Jan. 4, 2006, now Pat. No. 7,294,067.

(30) Foreign Application Priority Data

Jul. 2, 2007    (JP)    ............................. 2007-174031

(51) Int. Cl.
    A63B 37/00    (2006.01)
(52) U.S. Cl. ...................................... 473/351
(58) Field of Classification Search ................ 473/351, 473/367, 368
    See application file for complete search history.

(56) References Cited

U.S. PATENT DOCUMENTS

| | | | |
|---|---|---|---|
| 6,184,276 B1 | 2/2001 | Ignatz-Hoover | |
| 6,194,505 B1* | 2/2001 | Sone et al. | 524/432 |
| 6,277,924 B1 | 8/2001 | Hamada et al. | |
| 6,372,847 B1 | 4/2002 | Wouters | |
| 6,596,801 B2* | 7/2003 | Higuchi et al. | 524/432 |
| 6,602,941 B2 | 8/2003 | Higuchi et al. | |
| 6,634,961 B2 | 10/2003 | Higuchi et al. | |
| 6,695,716 B2 | 2/2004 | Higuchi et al. | |
| 6,712,715 B2 | 3/2004 | Higuchi et al. | |
| 6,786,836 B2 | 9/2004 | Higuchi et al. | |
| 6,795,172 B2 | 9/2004 | Putman et al. | |
| 6,818,705 B2 | 11/2004 | Wu et al. | |
| 6,841,642 B2 | 1/2005 | Kaszas | |
| 6,921,345 B2 | 7/2005 | Higuchi et al. | |
| 6,923,735 B1 | 8/2005 | Hayashi | |
| 7,250,010 B1* | 7/2007 | Shindo et al. | 473/351 |
| 7,294,067 B2* | 11/2007 | Shindo et al. | 473/351 |
| 7,566,280 B2* | 7/2009 | Shindo et al. | 473/351 |
| 2004/0147694 A1 | 7/2004 | Sone et al. | |
| 2005/0148723 A1 | 7/2005 | Kondou | |

FOREIGN PATENT DOCUMENTS

| | | |
|---|---|---|
| JP | 7-268132 A | 10/1995 |
| JP | 11-35633 A | 2/1999 |
| JP | 2002-355336 A | 12/2002 |
| JP | 2002-355337 A | 12/2002 |
| JP | 2002-355338 A | 12/2002 |
| JP | 2002-355339 A | 12/2002 |
| JP | 2002-355340 A | 12/2002 |
| JP | 2002-356581 A | 12/2002 |
| JP | 2004-292667 A | 10/2004 |
| WO | 03/082925 | 10/2003 |

OTHER PUBLICATIONS

Report of Research & Development, Fine Chemical, vol. 23, No. 9, p. 5-15 (1994).
Hydrolysis of Tri-tert-butylaluminum by Mason et al., J. American Chemical Society, vol. 115, pp. 4971-4984 (1993).
Three-Coordinate Aluminum is Not a Prerequisite for Catalytic Activity in the Zirconocene-Alumoxane Polymerization of Ethylene, by Harlen et al, J. American Chemical Society, vol. 117, pp. 6465-6474, (1995).

* cited by examiner

*Primary Examiner*—Raeann Trimiew
(74) *Attorney, Agent, or Firm*—Sughrue Mion, PLLC

(57) ABSTRACT

The invention provides a golf ball having a ball component made of a material molded under heat from a rubber composition of (a) a base rubber which includes a polybutadiene of at least 40% cis-1,4 structure, (b) an unsaturated carboxylic acid and/or a metal salt thereof, (c) an organic peroxide, and (d) a halogenated thiophenol, and/or a metal salt thereof, which is prepared by reacting starting materials in a polar solvent then washing with water and drying. The golf ball of the invention uses as a ball component a material of exceptional resilience which is obtained by molding a rubber composition under applied heat. As a result, the ball as a whole has an excellent rebound.

16 Claims, No Drawings

GOLF BALL

CROSS-REFERENCE TO RELATED APPLICATION

This application is a continuation of U.S. application Ser. No. 11/878,943 filed Jul. 27, 2007, now U.S. Pat No. 7,566,280 which is a continuation-in-part of application Ser. No. 11/324,297 filed on Jan. 4, 2006, now U.S. Pat. No. 7,294,067 the entire contents of which are hereby incorporated by reference.

This application claims priority under 35 U.S.C. §119(a) on Patent Application No. 2007-174031 filed in Japan on Jul. 2, 2007, the entire contents of which are hereby incorporated by reference.

BACKGROUND OF THE INVENTION

The present invention relates to a golf ball having an excellent rebound.

Efforts to confer golf balls with an excellent rebound have until now focused on and optimized one or more indicator of the polybutadiene used as the base rubber, such as the Mooney viscosity, polymerization catalyst, solvent viscosity and molecular weight distribution. See, for example, Patent Document 1: JP-A 2004-292667; Patent Document 2: U.S. Pat. No. 6,818,705; Patent Document 3: JP-A 2002-355336; Patent Document 4: JP-A 2002-355337; Patent Document 5: JP-A 2002-355338; Patent Document 6: JP-A 2002-355339; Patent Document 7: JP-A 2002-355340; and Patent Document 8: JP-A 2002-356581.

For example, Patent Document 1 (JP-A 2004-292667) describes, as a base rubber for golf balls, a polybutadiene having a Mooney viscosity of from 30 to 42 and a molecular weight distribution (Mw/Mn) of from 2.5 to 3.8. Patent Document 2 (U.S. Pat. No. 6,818,705) describes, for the same purpose, a polybutadiene having a molecular weight of at least 200,000 and a resilience index of at least 40.

However, because many golfers desire golf balls capable of traveling a longer distance, there exists a need for the development of golf balls having an even better rebound.

To improve the resilience of the core, Patent Document 9 (JP-A 2-297384), for example, discloses art involving the addition of an organosulfur compound to the core material. Regarding the preparation of organosulfur compounds, preparation processes have been disclosed in which the solvent used has been improved (e.g., Patent Document 10 (JP-A 48-8739) and Patent Document 11 (JP-A 54-30127)).

Yet, there continues to be a desire for golf balls having an even higher rebound than golf balls which use the foregoing core material.

Patent Document 1: JP-A 2004-292667
Patent Document 2: U.S. Pat. No. 6,818,705
Patent Document 3: JP-A 2002-355336
Patent Document 4: JP-A 2002-355337
Patent Document 5: JP-A 2002-355338
Patent Document 6: JP-A 2002-355339
Patent Document 7: JP-A 2002-355340
Patent Document 8: JP-A 2002-356581
Patent Document 9: JP-A 2-297384
Patent Document 10: JP-A 48-8739
Patent Document 11: JP-A 54-30127

SUMMARY OF THE INVENTION

It is therefore an object of the invention to provide a golf ball having an exceptional rebound.

As a result of extensive investigations, the inventor has discovered that, in the production of golf balls in which a material molded under heat from a rubber composition that includes a base rubber, an unsaturated carboxylic acid and/or a metal salt thereof and an organic peroxide serves as a ball component, by both including in the base rubber (a) a polybutadiene of at least 40% cis-1,4 structure and also including in the rubber composition (d) a specific halogenated thiophenol, and/or a metal salt thereof, that has been prepared by reacting the starting materials in a polar solvent, followed by a water washing step and a drying step, there can be obtained a hot-molded rubber composition of exceptional resilience. Hence, golf balls in which such a hot-molded material serves as a ball component can be obtained as golf balls of exceptional rebound.

Accordingly, the invention provides the following golf ball.

[1] A golf ball comprising a ball component made of a material molded under heat from a rubber composition comprising (a) a base rubber which includes a polybutadiene of at least 40% cis-1,4 structure, (b) an unsaturated carboxylic acid and/or a metal salt thereof, (c) an organic peroxide, and (d) a halogenated thiophenol, and/or a metal salt thereof, which is prepared by reacting starting materials in a polar solvent then washing with water and drying.

[2] The golf ball of [1], wherein the polybutadiene is a polybutadiene prepared using a rare-earth catalyst.

[3] The golf ball of [1], wherein the polybutadiene has a stress relaxation time ($T_{80}$), defined as the time in seconds from the moment when rotation is stopped immediately after measurement of the $ML_{1+4}$ (100° C.) value (the Mooney viscosity measured at 100° C. in accordance with ASTM D-1646-96) that is required for the $ML_{1+4}$ value to decrease 80%, of 5.5 or less.

[4] The golf ball of [3], wherein the polybutadiene has a stress relaxation time ($T_{80}$) of 3.5 or less.

[5] The golf ball of [3], wherein butadiene having a stress relaxation time ($T_{80}$) of 5.5 or less accounts for at least 40 wt % of the base rubber.

[6] The golf ball of [1], wherein polybutadiene having a stress relaxation time ($T_{80}$) of 5.5 or less is a polybutadiene prepared by polymerization using a rare-earth catalyst, followed by terminal modification.

[7] The golf ball of [1], wherein the preparation of ingredient (d) further includes washing with water containing a surfactant.

[8] The golf ball of [1], wherein ingredient (d) is the zinc salt of pentachlorothiophenol.

DETAILED DESCRIPTION OF THE INVENTION

The invention is described more fully below.

The golf ball of the invention has a ball component made of a material molded under heat from a rubber composition which includes the following ingredients (a) to (d):

(a) a base rubber which includes a polybutadiene of at least 40% cis-1,4 structure,
(b) an unsaturated carboxylic acid and/or a metal salt thereof,
(c) an organic peroxide, and
(d) a halogenated thiophenol, and/or a metal salt thereof, which is prepared by reacting starting materials in a polar solvent then washing with water and drying.

In the invention, the base rubber includes polybutadiene of at least 40% cis-1,4 structure. The cis-1,4 bond content of the polybutadiene is preferably at least 60%, more preferably at least 80%, even more preferably at least 90%, and most preferably at least 95%. In addition, it is recommended that the polybutadiene have a 1,2-vinyl bond content of preferably 2% or less, more preferably 1.7% or less, even more preferably 1.5% or less, and most preferably 1.3% or less. At a cis-1,4 bond content or a 1,2-vinyl bond content outside of these ranges, the rebound may decrease.

The foregoing polybutadiene has a Mooney viscosity ($ML_{1+4}$ (100° C.)) which, while not subject to any particular limitation, is preferably at least 20 but not more than 80.

From the standpoint of rebound, it is preferable for the above polybutadiene used in the invention to be a polybutadiene prepared using a rare-earth catalyst.

A known rare-earth catalyst may be used for this purpose. Exemplary rare-earth catalysts include those made up of a combination of a lanthanide series rare-earth compound, an organoaluminum compound, an alumoxane, a halogen-bearing compound, and an optional Lewis base.

Examples of suitable lanthanide series rare-earth compounds include halides, carboxylates, alcoholates, thioalcoholates and amides of atomic number 57 to 71 metals.

Organoaluminum compounds that may be used include those of the formula $AlR^1R^2R^3$ (wherein $R^1$, $R^2$ and $R^3$ are each independently a hydrogen or a hydrocarbon group of 1 to 8 carbons).

Preferred alumoxanes include compounds of the structures shown in formulas (I) and (II) below. The alumoxane association complexes described in *Fine Chemical* 23, No. 9, 5 (1994), *J. Am. Chem. Soc.* 115, 4971 (1993), and *J. Am. Chem. Soc.* 117, 6465 (1995) are also acceptable.

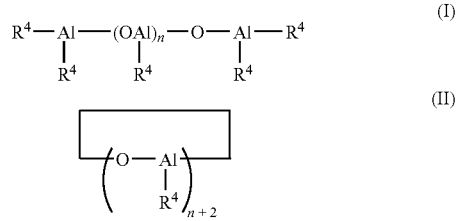

In the above formulas, $R^4$ is a hydrocarbon group having 1 to 20 carbon atoms, and n is 2 or a larger integer.

Examples of halogen-bearing compounds that may be used include aluminum halides of the formula $AlX_nR_{3-n}$ (wherein X is a halogen; R is a hydrocarbon group of 1 to 20 carbons, such as an alkyl, aryl or aralkyl; and n is 1, 1.5, 2 or 3); strontium halides such as $Me_3SrCl$, $Me_2SrCl_2$, $MeSrHCl_2$ and $MeSrCl_3$; and other metal halides such as silicon tetrachloride, tin tetrachloride and titanium tetrachloride.

The Lewis base can be used to form a complex with the lanthanide series rare-earth compound. Illustrative examples include acetylacetone and ketone alcohols.

In the practice of the invention, the use of a neodymium catalyst in which a neodymium compound serves as the lanthanide series rare-earth compound is particularly advantageous because it enables a polybutadiene rubber having a high cis-1,4 bond content and a low 1,2-vinyl bond content to be obtained at an excellent polymerization activity. Preferred examples of such rare-earth catalysts include those mentioned in JP-A 11-35633.

The polymerization of butadiene in the presence of a rare-earth catalyst may be carried out by bulk polymerization or vapor phase polymerization, either with or without the use of solvent, and at a polymerization temperature in a range of preferably from −30 to +150° C., and more preferably from 10 to 100° C.

To manufacture golf balls of stable quality, it is desirable for the above-described polybutadiene used in the invention to be a terminal-modified polybutadiene obtained by polymerization using the above-described rare-earth catalyst, followed by the reaction of a terminal modifier with active end groups on the polymer.

A known terminal modifier may be used for this purpose. Illustrative examples include compounds of types (1) to (6) below.

(1) Halogenated organometallic compounds, halogenated metallic compounds and organometallic compounds of the general formulas $R^5{}_nM'X_{4-n}$, $M'X_4$, $M'X_3$, $R^5{}_nM'(—R^6—COOR^7)_{4-n}$ or $R^5{}_nM'(—R^6—COR^7)_{4-n}$ (wherein $R^5$ and $R^6$ are each independently a hydrocarbon group of 1 to 20 carbons; $R^7$ is a hydrocarbon group of 1 to 20 carbons which may contain pendant carbonyl or ester groups; M' is a tin, silicon, germanium or phosphorus atom; X is a halogen atom; and n is an integer from 0 to 3);

(2) heterocumulene compounds having on the molecule a Y=C=Z linkage (wherein Y is a carbon, oxygen, nitrogen or sulfur atom; and Z is an oxygen, nitrogen or sulfur atom);

(3) three-membered heterocyclic compounds containing on the molecule the following bonds

(wherein Y is an oxygen, nitrogen or sulfur atom);

(4) halogenated isocyano compounds;

(5) carboxylic acids, acid halides, ester compounds, carbonate compounds and acid anhydrides of the formula $R^8—(COOH)_m$, $R^9(COX)_m$, $R^{10}—(COO—R^{11})$, $R^{12}—OCOO—R^{13}$, $R^{14}—(COOCO—R^{15})_m$ or

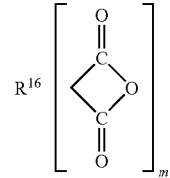

(wherein $R^8$ to $R^{16}$ are each independently a hydrocarbon group of 1 to 50 carbons, X is a halogen atom, and m is an integer from 1 to 5); and (6) carboxylic acid metal salts of the formula $R^{17}{}_lM''(OCOR^{18})_{4-1}$, $R^{19}{}_lM''(OCO—R^{20}—COOR^{21})_{4-1}$ or

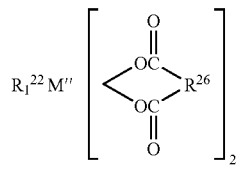

(wherein $R^{17}$ to $R^{23}$ are each independently a hydrocarbon group of 1 to 20 carbons, M'' is a tin, silicon or germanium atom, and the letter l is an integer from 0 to 3).

Specific examples of the above terminal modifiers (1) to (6) and methods for their reaction are described in, for example, JP-A 11-35633 and JP-A 7-268132.

In the practice of the invention, the above-described polybutadiene is included within the base rubber and accounts for preferably at least 40 wt %, more preferably at least 50 wt %, even more preferably at least 60 wt %, and even up to 100 wt %, of the base rubber. If this proportion is too low, the rebound may decrease.

No particular limitation is imposed on rubber compounds other than the above polybutadiene which may be included in the base rubber. For example, polybutadiene rubbers having a stress relaxation time $T_{80}$ of more than 3.5 may be included, as can also other rubber compounds such as styrene-butadiene rubbers (SBR), natural rubbers, polyisoprene rubbers and ethylene-propylene-diene rubbers (EPDM). These may be used individually or as combinations of two or more thereof.

The Mooney viscosity of such additional rubbers included in the base rubber, while not subject to any particular limitation, is preferably at least 20 but preferably not more than 80.

Rubbers synthesized with a group VIII catalyst may be used as such additional rubbers included in the base rubber. Exemplary group VIII catalysts include the following nickel catalysts and cobalt catalysts.

Examples of suitable nickel catalysts include single-component systems such as nickel-kieselguhr, binary systems such as Raney nickel/titanium tetrachloride, and ternary systems such as nickel compound/organometallic compound/boron trifluoride etherate. Exemplary nickel compounds include reduced nickel on a carrier, Raney nickel, nickel oxide, nickel carboxylate and organonickel complex salts. Exemplary organometallic compounds include trialkylaluminum compounds such as triethylaluminum, tri-n-propylaluminum, triisobutylaluminum and tri-n-hexylaluminum; alkyllithium compounds such as n-butyllithium, sec-butyllithium, tert-butyllithium and 1,4-dilithiumbutane; and dialkylzinc compounds such as diethylzinc and dibutylzinc.

Examples of suitable cobalt catalysts include cobalt and cobalt compounds such as Raney cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyldithiocarbamate, cobalt anilinium nitrite and cobalt dinitrosyl chloride. It is particularly advantageous to use these compounds in combination with, for example, a dialkylaluminum monochloride such as diethylaluminum monochloride or diisobutylaluminum monochloride; a trialkylaluminum such as triethylaluminum, tri-n-propylaluminum, triisobutylaluminum or tri-n-hexylaluminum; an alkylaluminum sesquichloride such as ethylaluminum sesquichloride; or aluminum chloride.

Polymerization using the above group VIII catalysts, and particularly a nickel or cobalt catalyst, can be carried out by a process in which, typically, the catalyst is continuously charged into a reactor together with a solvent and butadiene monomer, and the reaction conditions are suitably selected, such as a reaction temperature in a range of 5 to 60° C. and a reaction pressure in a range of atmospheric pressure to 70 plus atmospheres, so as to yield a product having the above-indicated Mooney viscosity.

The above polybutadiene is not subject to any particular limitation, although it is preferable for the stress relaxation time ($T_{80}$), as defined below, to be 5.5 or less.

The stress relaxation time ($T_{80}$) is the time in seconds, from the moment when rotor rotation is stopped immediately after measurement of the $ML_{1+4}$ (100° C.) value (the Mooney viscosity measured at 100° C. in accordance with ASTM D-1646-96), that is required for the $ML_{1+4}$ value to decrease 80%.

The term "Mooney viscosity" used herein refers to an industrial indicator of viscosity as measured with a Mooney viscometer, which is a type of rotary plastometer. The unit symbol used is $ML_{1+4}$ (100° C.), where "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

The above polybutadiene has a $T_{80}$ value of preferably 5.5 or less, more preferably 3.5 or less, more preferably 3.0 or less, even more preferably 2.8 or less, and most preferably 2.5 or less. The $T_{80}$ value has a lower limit of preferably 1 or more, and more preferably 1.5 or more. If the $T_{80}$ value is too small, problems with the workability may arise.

Above component (b) may be an unsaturated carboxylic acid, specific examples of which include acrylic acid, methacrylic acid, maleic acid and fumaric acid. Acrylic acid and methacrylic acid are especially preferred. Alternatively, it may be the metal salt of an unsaturated carboxylic acid, examples of which include the zinc and magnesium salts of unsaturated fatty acids such as zinc dimethacrylate and zinc diacrylate. The use of zinc diacrylate is especially preferred.

It is recommended that the content of above component (b) per 100 parts by weight of the base rubber be preferably at least 10 parts by weight, and more preferably at least 15 parts by weight, but preferably not more than 60 parts by weight, more preferably not more than 50 parts by weight, even more preferably not more than 45 parts by weight, and most preferably not more than 40 parts by weight. Too much component (b) will make the material molded under heat from the rubber composition too hard, giving the golf ball an unpleasant feel on impact. On the other hand, too little will result in a lower rebound.

Above component (c) may be a commercially available product, suitable examples of which include Percumyl D (produced by NOF Corporation), Perhexa C (NOF Corporation) and Luperco 231XL (Atochem Co.). If necessary, a combination of two or more different organic peroxides may be used.

It is recommended that the amount of component (c) per 100 parts by weight of the base rubber be preferably at least 0.1 part by weight, and more preferably at least 0.3 part by weight, but preferably not more than 5 parts by weight, more preferably not more than 4 parts by weight, even more preferably not more than 3 parts by weight, and most preferably not more than 2 parts by weight. Too much or too little component (c) may make it impossible to obtain a suitable hardness distribution, resulting in a poor feel on impact, durability and rebound.

To further improve rebound, the rubber composition in the invention includes also (d) a halogenated thiophenol, and/or a metal salt thereof, which is prepared by reacting starting materials in a polar solvent then washing with water and drying.

Specific examples of such halogenated thiophenols and/or metal salts thereof include the metal salts of mono-, di-, tri-, tetra- and pentahalothiophenols, such as the zinc salts of pentachlorothiophenol, pentafluorothiophenol, pentabromothiophenol and p-chlorothiophenol. These may be used singly or as combinations of two or more thereof. Use of the zinc salt of pentachlorothiophenol is especially preferred.

The halogenated thiophenol and/or a metal salt thereof is prepared by reacting the starting materials in a polar solvent, then passing the reaction product through a water washing step and a drying step. The polar solvent, although not subject to any particular limitation, is exemplified by dimethylformamide and pyridine. Of these, the use of dimethylformamide is preferred. Typically, when a halogenated thiophenol is prepared, in the case of pentachlorothiophenol, for example, the product may be obtained by reacting hexachlorobenzene with sodium sulfide or sodium bisulfide as the starting materials, although the invention is not limited to these starting materials. The zinc salt of pentachlorothiophenol may be obtained by adding zinc chloride or the like to the pentachlorothiophenol prepared as described above, although the invention is not limited to these starting materials.

Following the above reaction, the product is washed with water so as to remove the synthesis solvent. It is preferable to use warm water having a temperature of about 40 to 80° C. In addition, it is desirable to suitably add a surfactant to the water used for washing. Exemplary surfactants include anionic surfactants and cationic surfactants, as well as nonionic surfactants. The invention is not limited with regard to these types of surfactant. Preferred examples of surfactants for use here include alkylbenzenesulfonic acids and sodium salts thereof. The amount of surfactant added, based on the total amount of water, is preferably 5 wt % or less, more preferably 3 wt % or less, even more preferably 1 wt % or less, and most preferably 0.5 wt % or less. Washing with water and/or a surfactant is more effective when carried out at least two times, preferably at least three times, more preferably at least four times, even more preferably at least five times, and most preferably six or more times. Any suitable washing technique may be used, such as washing by agitation in a water tank and washing by continuous treatment in a filter. The drying step may be carried out, for example, at 100 to 150° C. for 2 to 12 hours, or these conditions may be combined with reduced pressure conditions, although the invention is not limited to these specific conditions.

When a halogenated thiophenol and/or a metal salt thereof is prepared by subjecting the product of synthesis to such water washing and drying steps, the organosulfur compound contributes significantly to the butadiene crosslinked structure of the rubber composition, enabling the resilience to be increased even further.

It is recommended that the amount of component (d) included per 100 parts by weight of the base rubber be preferably at least 0.1 part by weight, more preferably at least 0.2 part by weight, and even more preferably at least 0.5 part by weight, but preferably not more than 5 parts by weight, more preferably not more than 4 parts by weight, and even more preferably not more than 3 parts by weight. Too much organosulfur compound may make the material molded under heat from the rubber composition too soft, whereas too little may make an improved rebound difficult to achieve.

Additives such as inorganic fillers and antioxidants may also be included in the rubber composition of the invention. Illustrative examples of inorganic fillers include zinc oxide, barium sulfate, and calcium carbonate. It is recommended that the amount of inorganic filler included per 100 parts by weight of the base rubber be preferably at least 5 parts by weight, more preferably at least 7 parts by weight, even more preferably at least 10 parts by weight, and most preferably at least 13 parts by weight, but preferably not more than 80 parts by weight, more preferably not more than 50 parts by weight, even more preferably not more than 45 parts by weight, and most preferably not more than 40 parts by weight. Too much or too little inorganic filler may make it impossible to obtain a proper golf ball weight and a suitable rebound.

To increase the rebound, it is desirable for the inorganic filler to include zinc oxide in an amount of at lo least 50 wt %, preferably at least 75 wt %, and most preferably 100 wt % (where the zinc oxide accounts for 100% of the inorganic filler).

The zinc oxide has an average particle size (by air permeametry) of preferably at least 0.01 µm, more preferably at least 0.05 µm, and most preferably at least 0.1 µm, but preferably not more than 2 µm, and more preferably not more than 1 µm.

Examples of suitable commercial antioxidants include 2,2'-methylenebis(4-methyl-6-t-butylphenol) (Nocrac NS-6, available from Ouchi Shinko Chemical Industry Co., Ltd.) and 2,2'-methylenebis(4-ethyl-6-t-butylphenol) (Nocrac NS-5, Ouchi Shinko Chemical Industry Co., Ltd.). To achieve a good rebound and durability, it is recommended that the amount of antioxidant included per 100 parts by weight of the base rubber be preferably more than 0 part by weight, more preferably at least 0.05 part by weight, even more preferably at least 0.1 part by weight, and most preferably at least 0.2 part by weight, but preferably not more than 3 parts by weight, more preferably not more than 2 parts by weight, even more preferably not more than 1 part by weight, and most preferably not more than 0.5 part by weight.

The material molded under heat from a rubber composition in the present invention can be obtained by vulcanizing and curing the rubber composition using a method of the same sort as that used on prior-art rubber compositions for golf balls. Vulcanization may be carried out, for example, at a temperature of from 100 to 200° C. for a period of 10 to 40 minutes.

It is recommended that the material molded under heat from a rubber composition in the present invention have a hardness difference, obtained by subtracting the JIS-C hardness at the center of the hot-molded material from the JIS-C hardness at the surface of the material, of preferably at least 15, more preferably at least 16, even more preferably at least 17, and most preferably at least 18, but preferably not more than 50, and more preferably not more than 40. Setting the hardness within this range is desirable for achieving a golf ball having a soft feel and a good rebound and durability.

It is also recommended that the material molded under heat from a rubber composition in the invention, regardless of which of the subsequently described golf balls in which it is used, have a deflection, when compressed under a final load of 1275 N (130 kgf) from an initial load of 98 N (10 kgf), of preferably at least 2.0 mm, more preferably at least 2.5 mm, and even more preferably at least 2.8 mm, but preferably not more than 6.0 mm, more preferably not more than 5.5 mm, even more preferably not more than 5.0 mm, and most preferably not more than 4.5 mm. Too small a deflection may worsen the feel of the ball on impact and, particularly on long shots such as with a driver in which the ball incurs a large deformation, may subject the ball to an excessive rise in spin, shortening the distance traveled by the ball. On the other hand, a hot-molded material that is too soft may deaden the feel of the golf ball when played and compromise the rebound of the ball, resulting in a shorter distance, and may give the ball a poor durability to cracking with repeated impact.

The golf ball of the invention includes the above-described hot-molded material as a ball component, but the construction of the ball is not subject to any particular limitation. Examples of suitable golf ball constructions include one-piece golf balls in which the hot-molded material serves directly as the golf ball, solid two-piece golf balls wherein the hot-molded material serves as a solid core on the surface of which a cover has been formed, solid multi-piece golf balls made of three or more pieces in which the hot-molded material serves as a solid core on the outside of which a cover composed of two or more layers has been formed, thread-wound golf balls in which the hot-molded material serves as the center core, and multi-piece golf balls in which the hot-molded material serves as an intermediate layer or outermost layer that encloses a solid core. Solid two-piece golf balls and solid multi-piece golf balls in which the hot-molded material serves as a solid core are preferred because such golf ball constructions are able to exploit most effectively the characteristics of the hot-molded material.

In the practice of the invention, when the hot-molded material is used as a solid core, it is recommended that the solid core have a diameter of preferably at least 30.0 mm, more preferably at least 32.0 mm, even more preferably at least 35.0 mm, and most preferably at least 37.0 mm, but preferably not more than 41.0 mm, more preferably not more than 40.5 mm, even more preferably not more than 40.0 mm, and most preferably not more than 39.5 mm.

In particular, it is recommended that such a solid core in a solid two-piece golf ball have a diameter of preferably at least 37.0 mm, more preferably at least 37.5 mm, even more preferably at least 38.0 mm, and most preferably at least 38.5 mm, but preferably not more than 41.0 mm, more preferably not more than 40.5 mm, and even more preferably not more than 40.0 mm.

It is recommended that such a solid core in a solid three-piece golf ball have a diameter of preferably at least 30.0 mm, more preferably at least 32.0 mm, even more preferably at least 34.0 mm, and most preferably at least 35.0 mm, but preferably not more than 40.0 mm, more preferably not more than 39.5 mm, and even more preferably not more than 39.0 mm.

It is also recommended that the solid core have a specific gravity of preferably at least 0.9, more preferably at least 1.0, and even more preferably at least 1.1, but preferably not more than 1.4, more preferably not more than 1.3, and even more preferably not more than 1.2.

When the hot-molded material of the invention is used as a core to form a solid two-piece golf ball or a solid multi-piece golf ball, known cover materials and intermediate layer materials may be used. Exemplary cover materials and intermediate layer materials include thermoplastic or thermoset polyurethane elastomers, polyester elastomers, ionomer resins, polyolefin elastomers, and mixtures thereof. In particular, the use of thermoplastic polyurethane elastomers and ionomer resins is preferred. These may be used singly or as combinations of two or more thereof. Alternatively, when a golf ball is formed with the hot-molded material in the invention serving as an intermediate layer or outermost layer enclosing a solid core, use may be made of known core materials, intermediate layer materials and cover materials.

Illustrative examples of thermoplastic polyurethane elastomers that may be used for the above purpose include commercial products in which the diisocyanate is an aliphatic or aromatic compound, such as Pandex T7298, Pandex T7295, Pandex T7890, Pandex TR3080, Pandex T8295 and Pandex T8290 (all manufactured by DIC Bayer Polymer, Ltd.). When an ionomer resin is used as the cover material, illustrative examples of suitable commercial ionomer resins include Surlyn 6320 and Surlyn 8120 (both products of E.I. DuPont de Nemours and Co., Inc.), and Himilan 1706, Himilan 1605, Himilan 1855, Himilan 1601 and Himilan 1557 (all products of DuPont-Mitsui Polychemicals Co., Ltd.).

The cover material may include also, as an optional ingredient, a polymer other than the foregoing thermoplastic elastomers. Specific examples of polymers that may be included as optional ingredients include polyamide elastomers, styrene block elastomers, hydrogenated polybutadienes and ethylene-vinyl acetate (EVA) copolymers.

The above-described solid two-piece golf balls and solid multi-piece golf balls may be manufactured by a known method. When producing solid two-piece and multi-piece golf balls, preferred use may be made of a known method wherein the hot-molded material is placed as the solid core within a particular injection-molding mold, following which a cover material is injected over the core to form a solid two-piece golf ball, or an intermediate layer material and a cover material are injected in this order over the core to form a solid multi-piece golf ball. In some cases, production may be carried out by molding the above-described cover material under applied pressure.

It is recommended that the intermediate layer of the above solid multi-piece golf ball have a thickness of preferably at least 0.5 mm, and more preferably at least 1.0 mm, but preferably not more than 3.0 mm, more preferably not more than 2.5 mm, even more preferably not more than 2.0 mm, and most preferably not more than 1.6 mm.

It is also recommended that the cover have a thickness, whether in a solid two-piece golf ball or a solid multi-piece golf ball, of preferably at least 0.7 mm, and more preferably at least 1.0 mm, but preferably not more than 3.0 mm, more preferably not more than 2.5 mm, even more preferably not more than 2.0 mm, and most preferably not more than 1.6 mm.

The golf ball of the invention may be manufactured for competitive use by imparting the ball with a diameter and weight which conform with the Rules of Golf; that is, a diameter of at least 42.67 mm and a weight of not more than 45.93 g. It is recommended that the diameter be preferably not more than 44.0 mm, more preferably not more than 43.5 mm, and most preferably not more than 43.0 mm; and that the weight be preferably at least 44.5 g, more preferably at least 45.0 g, even more preferably at least 45.1 g, and most preferably at least 45.2 g.

The golf ball of the invention uses as a component therein a material which is molded under heat from a rubber composition and has an exceptional resilience. As a result, the ball as a whole has an excellent rebound.

EXAMPLES

The following Examples and Comparative Examples are provided by way of illustration and not by way of limitation.

Examples 1 to 4,

Comparative Example 1

Rubber compositions were prepared by using a kneader to masticate starting materials having the formulations shown in Table 1 below, then vulcanized in a spherical mold at 160° C. for 20 minutes, thereby giving 39.2 mm diameter cores (spherical moldings) weighing 36.9 g. The following method was used to prepare the zinc salt of pentachlorothiophenol.

Sodium sulfide (48 parts by weight) was dissolved in 70 parts by weight of dimethylformamide (solvent), following which 177 parts by weight of hexachlorobenzene was added and pentachlorothiophenol (intermediate) was prepared at 80° C. for 120 minutes under stirring. Next, 30 parts by weight of water was added as a solvent and 27 parts by weight of zinc chloride was reacted with the pentachlorothiophenol at 80° C. for 30 minutes, yielding the zinc salt of pentachlorothiophenol. The solvent was then recovered, and steps I and II below were employed.

I. Centrifugal dehydration

II. The zinc salt of pentachlorothiophenol was stirred and washed in a water tank filled with warm water to which had been added 0.5 wt % of sodium dodecylbenzenesulfonate (a surfactant).

Product obtained after repeating above steps I and II five times each was labeled as "Pentachlorothiophenol Zinc Salt A," and product obtained without employing whatsoever the washing steps I and II was labeled as "Pentachlorothiophenol Zinc Salt B."

Pentachlorothiophenol Zinc Salts A and B were then dried in an oven at 120° C. for 8 hours, yielding the final target product: pentachlorothiophenol zinc salt.

The contents of dimethylformamide (DMF) in Pentachlorothiophenol Zinc Salt A and Pentachlorothiophenol Zinc Salt B were each measured by infrared absorption spectroscopy using a Fourier transform infrared spectrophotometer (FT-IR) manufactured by Shimadzu Corporation. The absorption spectrum characteristic of DMF was observed in B, but was substantially not observed in A.

The deflection and initial velocity values for the cores obtained were measured according to the criteria described below. The results are shown in Table 1 below.

TABLE 1

|  |  | Example | | | | Comparative Example |
|---|---|---|---|---|---|---|
|  |  | 1 | 2 | 3 | 4 | 1 |
| Formulation (pbw) | Polybutadiene EC140 | 100 |  |  |  |  |
|  | Polybutadiene BR51 |  | 100 |  |  |  |
|  | Polybutadiene BR60 |  |  | 100 |  |  |
|  | Polybutadiene BR01 |  |  |  | 100 | 100 |
|  | Peroxide | 0.8 | 0.8 | 0.8 | 0.8 | 0.8 |
|  | Zinc oxide | 20 | 20 | 20 | 20 | 20 |
|  | Zinc diacrylate | 31 | 31 | 31 | 31 | 31 |
|  | Pentachlorothiophenol Zinc Salt A | 1 | 1 | 1 | 1 |  |
|  | Pentachlorothiophenol Zinc Salt B |  |  |  |  | 1 |
|  | Zinc stearate | 5 | 5 | 5 | 5 | 5 |
| Properties | Diameter (mm) | 39.2 | 39.2 | 39.2 | 39.2 | 39.2 |
|  | Weight (g) | 36.9 | 36.9 | 36.9 | 36.9 | 36.9 |
|  | Deflection (mm) | 2.9 | 2.9 | 2.9 | 2.8 | 3.2 |
|  | Core initial velocity index | 1.020 | 1.014 | 1.014 | 1.009 | 1.000 |

Details of the above formulation are provided below.

Polybutadiene rubber:
EC140 (trade name), available from Firestone Polymers. Polymerized with a neodymium catalyst. Mooney viscosity, 43; $T_{80}$ value, 2.3; cis-1,4 structure, 96%.

Polybutadiene rubber:
BR51 (trade name), available from JSR Corporation. Polymerized with a neodymium catalyst. Mooney viscosity, 39; $T_{80}$ value, 5.0; cis-1,4 structure, 96%.

Polybutadiene rubber:
BR60 (trade name), available from Polimeri Srl. Polymerized with a neodymium catalyst. Mooney viscosity, 57; $T_{80}$ value, 4.6; cis-1,4 structure, 98%.

Polybutadiene rubber:
BR01 (trade name), available from JSR Corporation. Polymerized with a nickel catalyst. Mooney viscosity, 48; $T_{80}$ value, 8.4; cis-1,4 structure, 96%.

Peroxide: Dicumyl peroxide, available from NOF Corporation under the trade name Percumyl D.

Zinc oxide: Available from Sakai Chemical Industry Co., Ltd. under the trade name Sanshu Sanka Aen. Average particle size, 0.6 μm (air permeametry). Specific surface area, 3.5 $m^2/g$ (BET method).

Zinc diacrylate: Available from Nippon Shokubai Co., Ltd.

Zinc stearate: Available from NOF Corporation under the trade name Zinc Stearate G.

Deflection

The amount of deformation (mm) by the core when compressed under a final load of 1,275 N (130 kgf) from an initial load state of 98 N (10 kgf) was determined.

Core Initial Velocity Index

The initial velocity was measured using an initial velocity measuring apparatus of the same type as that of the official golf ball regulating-body—USGA, and the results were expressed as relative values based on the value obtained in Comparative Example 1.

What is claimed is:

1. A golf ball comprising a ball component made of a material molded under heat from a rubber composition comprising (a) a base rubber which includes a polybutadiene of at least 40% cis-1,4 structure, (b) an unsaturated carboxylic acid and/or a metal salt thereof, (c) an organic peroxide, and (d) a halogenated thiophenol, and/or a metal salt thereof, which is prepared by reacting starting materials in a polar solvent and then washing with water and drying.

2. The golf ball of claim 1, wherein the polybutadiene is a polybutadiene prepared using a rare-earth catalyst.

3. The golf ball of claim 1, wherein the preparation of ingredient (d) further includes washing with water containing a surfactant.

4. The golf ball of claim 1, wherein ingredient (d) is the zinc salt of pentachlorothiophenol.

5. The golf ball of claim 1, wherein the polybutadiene is a polybutadiene having a stress relaxation time ($T_{80}$) of 5.5 or less and is a polybutadiene prepared by polymerization using a rare-earth catalyst, followed by terminal modification, and wherein polybutadiene having a stress relaxation time ($T_{80}$) of 5.5 or less accounts for at least 40 wt % of the base rubber.

6. The golf ball of claim 5, wherein the preparation of ingredient (d) further includes washing with water containing a surfactant.

7. The golf ball of claim 5, wherein ingredient (d) is the zinc salt of pentachlorothiophenol.

8. The golf ball of claim 1, wherein the polar solvent is dimethylformamide.

9. The golf ball of claim 3, wherein the washing with water containing a surfactant is carried out at least five times.

10. The golf ball of claim 6, wherein the washing with water containing a surfactant is carried out at least five times.

11. A method of manufacturing a golf ball, comprising the steps of:
   reacting starting materials in a polar solvent and then washing with water and drying to prepare (d) a halogenated thiophenol and/or a metal salt thereof, and
   molding a ball component made of a material molded under heat from a rubber composition comprising (a) a base rubber which includes a polybutadiene of at least 40% cis-1,4 structure, (b) an unsaturated carboxylic acid and/or a metal salt thereof, (c) an organic peroxide, and (d) the halogenated thiophenol, and/or the metal salt thereof.

12. The method of manufacturing a golf ball of claim 11, wherein the washing step for preparing (d) a halogenated thiophenol and/or a metal salt thereof further includes adding a surfactant to the water used for washing.

13. The method of manufacturing a golf ball of claim 11, wherein in the washing step for preparing (d) a halogenated thiophenol and/or a metal salt thereof, washing with water and/or a surfactant is carried out at least two times.

14. The method of manufacturing a golf ball of claim 11, wherein the drying step for preparing (d) a halogenated thiophenol and/or the metal salt thereof is carried out at 100 to 150° C. for 2 to 12 hours.

15. The method of manufacturing a golf ball of claim 11, wherein the polar solvent is dimethylformamide.

16. The method of manufacturing a golf ball of claim 12, wherein the washing with water containing a surfactant is carried out at least five times.

* * * * *